(12) United States Patent
De Souza et al.

(10) Patent No.: US 8,443,509 B1
(45) Date of Patent: May 21, 2013

(54) PREPARING BAR-WOUND STATOR CONDUCTORS FOR ELECTRICAL INTERCONNECTION

(75) Inventors: Urban J. De Souza, Rochester Hills, MI (US); Richard M. Kleber, Clarkston, MI (US); Justin Hanson, Dearborn Heights, MI (US); Frederick W. Rhoads, Holly, MI (US); John D. Campbell, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/449,866

(22) Filed: Apr. 18, 2012

(51) Int. Cl.
*H02K 15/00* (2006.01)
(52) U.S. Cl.
USPC .................. 29/596; 29/597; 29/598; 29/732; 29/735; 29/564.2
(58) Field of Classification Search
USPC ............. 29/596–598, 732–736, 564.2–564.4; 310/154.01, 184, 201, 208
See application file for complete search history.

(56) References Cited

U.S. PATENT DOCUMENTS

| | | | | |
|---|---|---|---|---|
| 4,335,325 | A * | 6/1982 | Miller et al. .................. | 310/214 |
| 5,765,274 | A * | 6/1998 | Beakes et al. ................. | 29/596 |
| 6,339,871 | B1 * | 1/2002 | Maesoba et al. .............. | 29/596 |
| 6,388,358 | B1 * | 5/2002 | Umeda et al. ................. | 310/201 |
| 6,501,206 | B2 * | 12/2002 | Oohashi et al. ............... | 310/184 |
| 7,210,215 | B2 * | 5/2007 | Kato et al ..................... | 29/596 |
| 7,287,311 | B2 * | 10/2007 | Ichikawa et al. .............. | 29/596 |
| 7,847,465 | B2 * | 12/2010 | Tokizawa ...................... | 310/201 |
| 8,296,926 | B2 * | 10/2012 | Wang et al. ................... | 29/596 |

\* cited by examiner

*Primary Examiner* — Minh Trinh
(74) *Attorney, Agent, or Firm* — Quinn Law Group, PLLC

(57) ABSTRACT

A method of preparing a plurality of bar-wound stator conductors for electrical interconnection includes inserting the plurality of conductors into a stator, twisting a conductor such that a first conductor of a first row is adjacent to a second conductor of a second row; trimming the adjacent first and second conductors to a common length using a trimming device; and grinding the trimmed first and second conductors to a pre-determined surface profile using a rotary cutting tool.

18 Claims, 4 Drawing Sheets

PREPARING BAR-WOUND STATOR CONDUCTORS FOR ELECTRICAL INTERCONNECTION

STATEMENT REGARDING FEDERALLY SPONSORED RESEARCH OR DEVELOPMENT

This invention was made with government support under DOE/NETL grant number DE-EE0002629. The invention described herein may be manufactured and used by or for the U.S. Government for U.S. Government (i.e., non-commercial) purposes without the payment of royalties thereon or therefore.

TECHNICAL FIELD

The present disclosure relates to methods of shaping the ends of bar-wound stator conductors.

BACKGROUND

Electric devices such as motors and generators having a stator secured within a housing of the motor/generator are well known. A rotor mounted on a shaft is coaxially positioned within the stator and is rotatable relative to the stator about the longitudinal axis of the shaft to transmit the force capacity of the motor. The passage of current through the stator creates a magnetic field tending to rotate the rotor and shaft.

Some stators are generally configured as an annular ring and are formed by stacking thin plates, or laminations, of highly magnetic steel. A copper winding of a specific pattern is configured, typically in slots of the lamination stack, through which current is flowed to magnetize sections of the stator assembly and to create a force reaction that causes the rotation of the rotor.

Bar pin stators are a particular type of stator that include a winding formed from a plurality of bar pins, or bar pin wires. The bar pin wires are formed from a heavy gauge copper wire with a rectangular cross section and generally configured in a hairpin shape having a curved section and typically terminating in two wire ends. The bar pins are accurately formed into a predetermined shape for insertion into specific rectangular slots in the stator, and are typically coated with an insulating material prior to insertion, such that the adjacent surfaces of the pins within the slots are electrically insulated from each other.

Typically, the curved ends of the bar pins protrude from one end of the lamination stack and the wire ends of the bar pins protrude from the opposite end of the lamination stack. After insertion, the portions of the wire protruding from the lamination stack are bent to form a complex weave from wire to wire, creating a plurality of wire end pairs. Adjacent paired wire ends are typically joined to form an electrical connection, such as through a welding operation. The resultant weave pattern and plurality of joints determines the flow of current through the motor, and thus the motive force of the rotor.

SUMMARY

A method of preparing a plurality of bar-wound stator conductors for electrical interconnection includes inserting the plurality of conductors into a stator, twisting the plurality of conductors such that a first conductor of a first row is adjacent to a second conductor of a second row; trimming the adjacent first and second conductors to a common length using a trimming device; and grinding the trimmed first and second conductors to a pre-determined surface profile using a rotary cutting tool. The pre-determined surface profile may include, for example, an internal chamfer or plurality of grooves.

Each of the plurality of conductors may include an insulation layer disposed about the surface of the conductor, where the method further includes the step of removing the insulation layer in an area that is proximate to an end of each of the respective first and second conductors.

The stator may include a plurality of slots, and inserting the plurality of conductors into the stator may include inserting four of the plurality of conductors into each of the plurality of slots. Each of the first row and the second row may then comprise four conductors disposed in a respective slot.

The method is particularly adapted for automated processing techniques, where it may further include sensing an angular position of the stator and controllably rotating the stator to align a row of conductors with the trimming device. Likewise the controller may transition the trimming device from an operational position to a docked position prior to controllably rotating the stator. As may be appreciated, the docked position may be more removed from the stator than the operational position.

In once configuration, trimming the adjacent first and second conductors to a common length may include removing a portion of each of the respective first and second conductors through shearing. Trimming of the first and second conductors in this manner may form a burr that protrudes from each respective conductor. As such, grinding the trimmed first and second conductors to a pre-determined surface profile may include removing the burr.

In one configuration, the method may further include stabilizing the plurality of conductors using a ring fixture, where the ring fixture defines a plurality of holes that extend through the fixture and are configured to receive the conductors. As may be appreciated, the ring fixture may include a stator-side facing the stator and a non-stator side facing away from the stator. To facilitate locating of the conductors in the fixture, each of the plurality of holes may have a larger cross-sectional area at the stator side than at the non-stator side.

The above features and advantages and other features and advantages of the present invention are readily apparent from the following detailed description of the best modes for carrying out the invention when taken in connection with the accompanying drawings.

DETAILED DESCRIPTION

Figure 1:
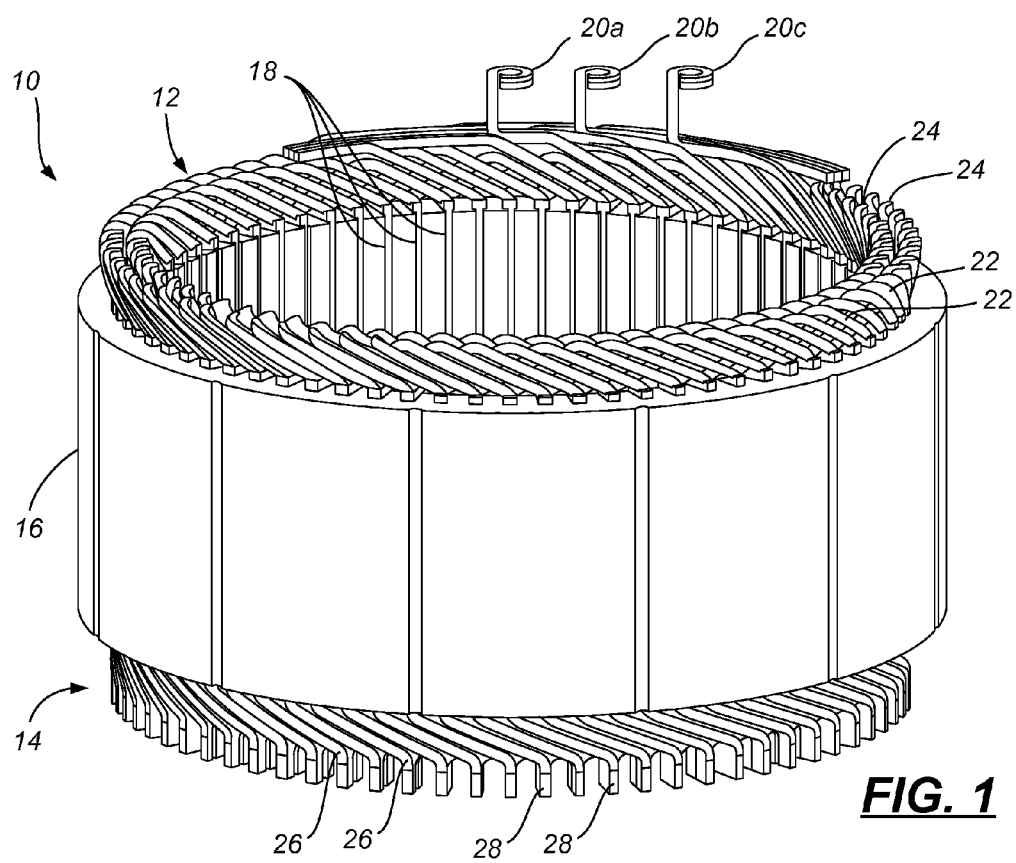
FIG. 1 is a schematic perspective view of a stator assembly prior to joining the wire ends of the stator winding.

Referring to the drawings, wherein like reference numerals are used to identify like or identical components in the various views, FIG. 1 schematically illustrates a stator assembly 10 of an electric machine having a plurality of bar-wound electrical conductor windings (generally at 12). The stator 10 may generally be configured as an annular ring and may be formed from a lamination stack 16 (i.e., a plurality of individual laminations stacked in an ordered manner) (also referred to as the "stator body 16"). Each lamination may include a plurality of radially distributed slots which may be oriented during assembly of the lamination stack 16 to define a plurality of generally rectangular slots 18 through the stator 10. Each slot 18 may be particularly adapted to receive one or more of the conductor windings 12.

As generally illustrated in FIG. 1, the stator 10 may be configured as a bar pin stator, wherein the conductor windings 12 are formed from a plurality of bar pins 24 (also referred to as "bar pin wires 24"). The conductor windings 12 may further include terminals or connections 20a, 20b and 20c, for connecting the various phases of the windings 12 to an electrical controller such as a power inverter module. The bar pin wires 24 are typically formed from a heavy gauge, high conductivity copper wire with a rectangular cross section. Each bar pin wire 24 may generally be configured in a hairpin-type shape, which has a curved section 22 at one end, and may terminate in two wire ends 28 at the opposing end. Prior to insertion, the bar pins 24 may be accurately formed into a predetermined shape to construct a predetermined weave pattern after insertion into the slots 18. In one configuration, the bar pins 24 may be coated with an insulating material 26 prior to insertion, such that the adjacent surfaces of the bar pins 24 within the slots 18 are electrically insulated from each other. To facilitate joining of the wire ends 28 to form an electrical connection, the wire ends 28 of the bar pins 24 may be stripped of the insulating layer 26 prior to insertion into the slots 18 of the lamination stack 16 and prior to bending to form a weave pattern such as the weave pattern shown in FIG. 1 and in additional detail in FIG. 2. Each slot 18 may be lined with a slot liner, to insulate the bar pins 24 from the lamination stack 16, and to prevent damage to the insulating layer 26 during insertion of the bar pins 24 in the slots 18.

FIG. 1 shows the curved ends 22 of the bar pins 24 protruding from one end of the lamination stack 16 and the wire ends 28 of the bar pins 24 protruding from the opposite end of the lamination stack 16 (i.e., the wire end portion 14 of the stator 10). As mentioned above, after insertion, the wire ends 28 protruding from the lamination stack 16 may be bent to form a complex weave of bar pins 24 on the wire end portion 14 of the stator 10. In this weave, each respective wire end 28 may be paired with and joined to a different wire end 28 according to the connection requirements of the winding 12.

Figure 2:
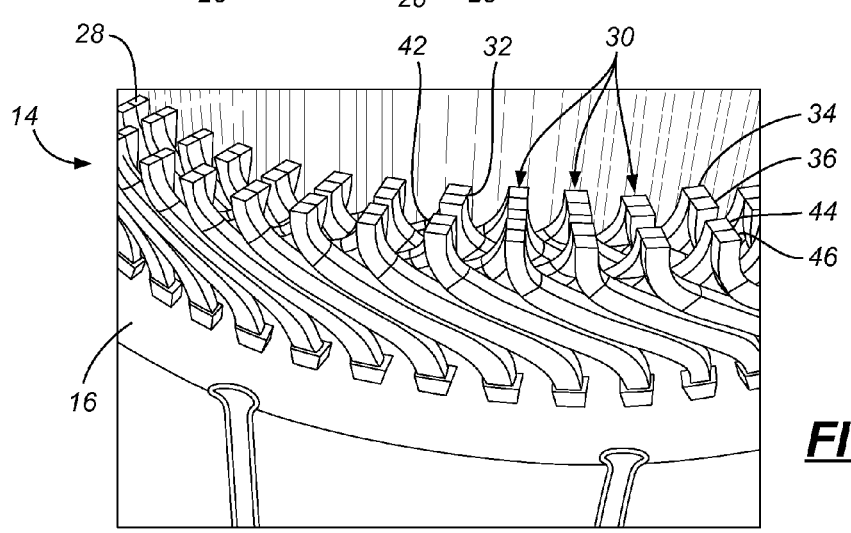
FIG. 2 is a partial schematic perspective view of the wire end portion of the stator assembly of FIG. 1.

FIG. 2 shows, by way of non-limiting example, a perspective view of the wire end portion 14 of stator 10. As illustrated, the collective wire ends 28 of the bar pins 24 may be arranged in four layers, with each layer being disposed radially outward of the previous layer. For example, the outermost layer may include a plurality of wire ends 28 closest to the outer diameter of the lamination pack 16, and the innermost layer may include a plurality of wire ends 28 closest to the inner diameter of the lamination stack 16. Additionally, the wire ends 28 may be aligned in a plurality of rows 30 that each extend radially outward from the center of the stator 10. As shown in FIG. 2, the plurality of wire ends forming the innermost or first layer of the winding 12 are identified as wire ends 34. The second layer of the winding 12, which is proximate to the first layer, is formed of a plurality of wire ends identified as wire ends 36. The third layer of the winding 12 is formed of a plurality of wire ends identified as wire ends 44. The outermost or fourth layer is formed of a plurality of wire ends identified as wire ends 46.

FIG. 2 shows each of the wire ends 34 in the first layer being bent such that it is proximate to and paired with a wire end 36 in the second layer, (i.e., forming a first, or inner wire end pair 32). Once suitably prepared, such as will be described below, the wire ends 34, 36 of the inner wire end pair 32 may be fused together, such as through an electric welding process (e.g., gas tungsten arc welding (GTAW or TIG welding), plasma arc welding (PAW), or electric resistance welding (ERW)), soldering, or through other similar processes that may create a mechanical and electrical bond between the wires 34, 36.

Similar to the inner wire pair 32, the wire ends 44 of the third layer may be bent such that they are each proximate to, and paired with a wire end 46 in the fourth layer, (i.e., forming a second, or outer wire end pair 42). The wire ends 44, 46 of the outer wire end pair 44 may be fused together through a process that may be similar to the one used to form the inner wire end pair 32.

Figure 3:
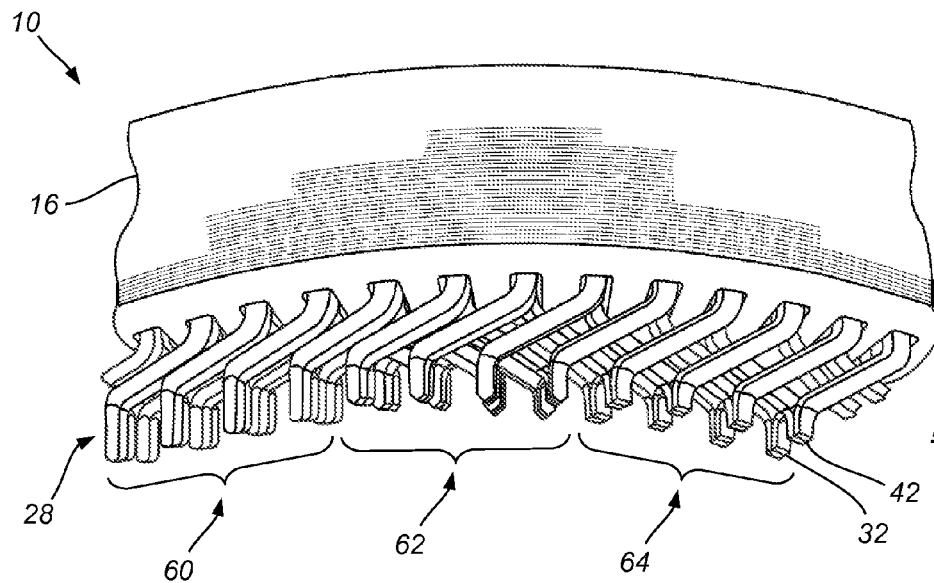
FIG. 3 is partial schematic perspective view of a wire end portion of a stator assembly, illustrating uncut wire ends, trimmed wire ends, and surfaced wire ends.

Prior to fusing the wire pairs 32, 44 together, it may be desirable to prepare the wires to better receive the fusing means (e.g., weld or solder). FIG. 3 schematically illustrates three wire end groupings 60, 62, 64, where each grouping respectively represents the conductors at a various manufacturing stage prior to fusing the wire ends together.

The first grouping 60 schematically illustrates the wires 28 following insertion into the stator 10 and twisting to form the weave. These wires may be purposely longer than required by the final design to account for manufacturing variation in the pre-insertion bending process and to reduce the amount of strain on the wires as they are woven together into the rotor slots for insertion. As such, the wires of the first grouping 60 have a length that is substantially unchanged from the original insertion.

The second wire end grouping 62 schematically illustrates a plurality of wires 28 that have been sheared from their initial length (i.e., group 60) by a trimming device. The trimming operation may ensure that the wire ends are all disposed at a substantially common length relative to the stator and/or each other. While such a trimming operation may provide a substantially uniform plane of trimmed wire ends 28, due to the malleability of copper, it may also produce a protruding nip/burr that may be difficult to weld (depending on the process used) and/or may be non-uniform from wire to wire.

The third wire end grouping 64 schematically illustrates a plurality of wires 28 that have been profiled/surfaced to remove the protruding nip/bur created via the trimming process. As such the profiling/surfacing may result in a plurality of wire ends that are substantially aligned along a plane that is normal to the central axis of the stator body 16 and at a controlled distance relative to the stator body 16. These profiled ends (e.g. grouping 64) may be particularly adapted to receive the fusing means (e.g., weld or solder) such as during an automated welding/soldering processes.

Figure 4:
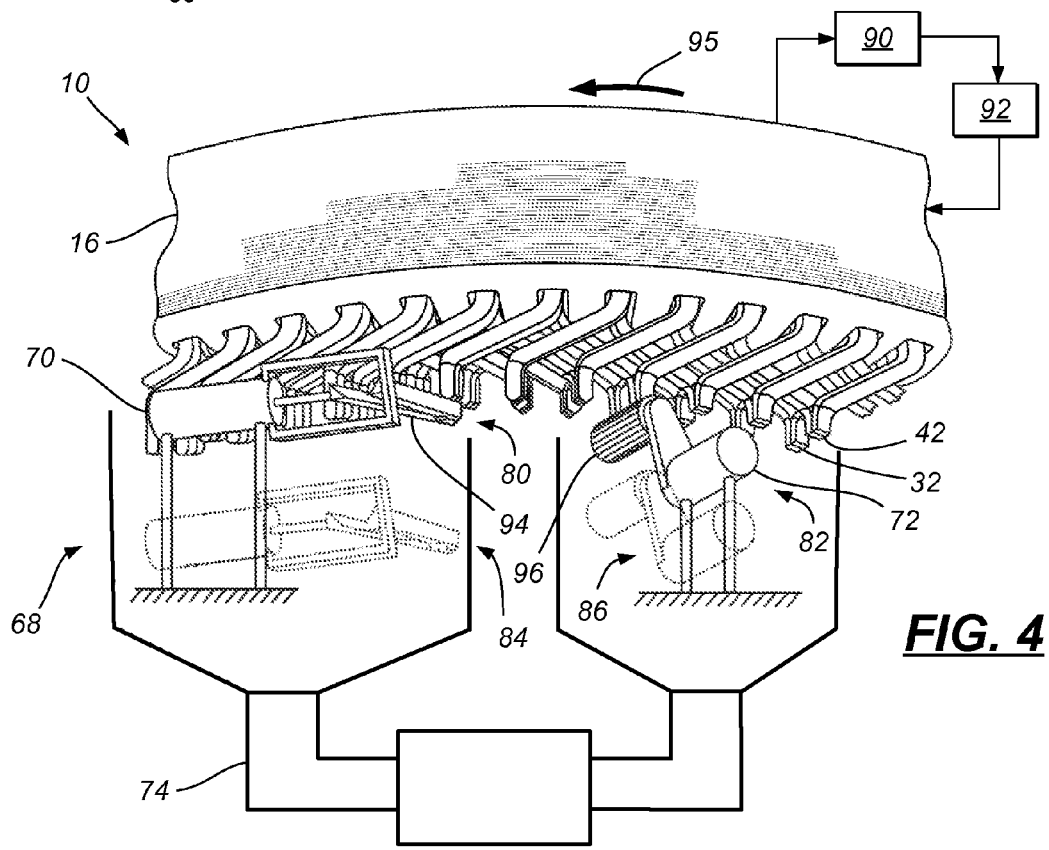
FIG. 4 is a partial schematic perspective view of the wire end portion of the stator assembly of FIG. 3 in communication with a trimming device and a surfacing device.

FIG. 4 schematically illustrates the stator 10 provided in FIG. 3, in communication with a manufacturing apparatus 68 that includes a trimming device 70 and a surfacing device 72. The trimming device 70 may generally be configured to cut the wire ends (i.e., resulting in wire end grouping 62), while the surfacing device 72 may generally be configured to grind/shape the trimmed ends to result in accurately profiled ends (i.e., generally illustrated as grouping 64). In one embodiment, the trimming 70 and surfacing 72 devices may be disposed underneath the stator assembly 10 such that the force of gravity may aid in removing all errant particles produced by the operations away from the stator. The manufacturing apparatus 68 may further include a vacuum system 74 that may draw air away from the stator to further prevent trimming and surfacing artifacts from falling into the stator 10. These precautions may aid in reducing the likelihood of a subsequent electrical short that may be caused by damaged/nicked wire insulation or debris trapped within the stator.

As shown in FIG. 4, in one configuration the trimming device 70 and the surfacing device 72 may each selectively transition between a respective operational position (generally at 80, 82) and a docked position (shown in phantom generally at 84, 86). While the trimming and surfacing devices 70, 72 are in their respective docked positions 84, 86, the stator assembly 10 may be permitted to more freely rotate relative to the manufacturing apparatus 68 and/or may be easily loaded and/or unloaded from the manufacturing apparatus 68.

During operation, the stator body 16 may be placed on an indexing turntable or clamped into a similar controllably rotatable fixture adjacent to the manufacturing apparatus 68. Initially, both the trimming device 70 and surfacing device 72 may be in their respective docked positions 84, 86. A sensing device 90 may monitor the angular position of the stator 10 relative to the manufacturing assembly 68, and may be in communication with a manufacturing controller 92 to control the indexing of the turntable. The controller 92 may initially align the stator 10 such that the first wire to be trimmed is bought into the proper position for trimming (i.e., disposed vertically above the trimming device 70). Once in position, the trimming device 70 may be raised up into the operational position 80 to trim the four wire ends of the two wire pairs 32, 42 with the trim head 94.

In one configuration, as generally shown in FIG. 4, the trim head 94 may include two shearing blades that are hinged to each other on one end of the blade. Likewise, other blade configurations and/or shearing mechanisms may be used to effectuate the trimming of the wire ends. As may be appreciated, the trim head may be hydraulically, pneumatically, or electrically actuated in a manner that causes the two shearing blades to act in cooperation to cut the wire ends.

Once the trim head 94 clips the wire ends, the wire trimming device 70 may return to the docked position 84 to allow the controller 92 to rotate the turntable in a direction 95, to bring an adjacent wire pair sets into position above the trimming device 70. Again, once the adjacent wire pair set is in proper position, the trimming device 70 may be raised into the operational position 80 to repeat the trimming process. This indexing and trimming may continue until all of the wires are cut.

The surfacing device 72 may use a rotating cutting tool 96 to accurately plane or profile the trimmed wire ends. Unlike the trimming device 70 which may toggle between the operational and docked positions 80, 84 for each row, in one configuration, the surfacing device 72 may remain in the operational position 82 for the entirety of the manufacturing process. As the stator 10 is rotated to bring the next set of wire pairs into the trimming position, the rotation feeds the next set of trimmed wire pairs across the surfacing mechanism's rotating cutting tool 96.

The rotating tool 96 may generally be in the form of a cylindrical cutting head such as an end mill, and/or may include an abrasive surface such as a grinding stone. When the stator's final set of wire pairs have been trimmed, the stator assembly 10 may continue to index until the final set of trimmed wire pairs is surfaced, even though no trimming is required in these last few indexes. When all of the wire pair sets have been trimmed and surfaced, the trimming and surfacing devices 70, 72 may return to their docked positions 84, 86 and the completed stator 10 may be removed from the manufacturing apparatus 68.

In one configuration, the rotating cutting tool 96 may be configured to shape the wire ends in a manner to more easily receive a weld or solder coupling. For example, and without limitation, as shown in FIGS. 5A-5D the rotating cutting tool 96 may plane the wire ends (FIG. 5A), cut internal chamfers (FIG. 5B), cut external chamfers (FIG. 5C), and/or cut a plurality of grooves (FIG. 5D) into the wire ends. Additionally, multiple profiles may be combined into a single tool 96.

Figure 5A:
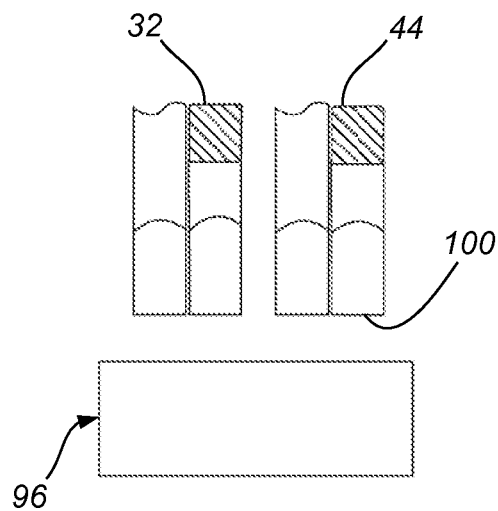
FIG. 5A is a schematic cross-sectional view of a plurality of wire end pairs adjacent a rotary cutting tool that is configured to cut a flat surface profile.

More specifically, FIG. 5A illustrates a flat surface profile 100 that may plane the wire pair ends as the ends are indexed across the surface of a cutting tool 96. In this embodiment, the rotating cutting tool 96 may have a purely cylindrical profile. The flat surface profile 100 of the wires may provide a well controlled and predictable surface for the mechanized placement of a weld bead.

Figure 5B:
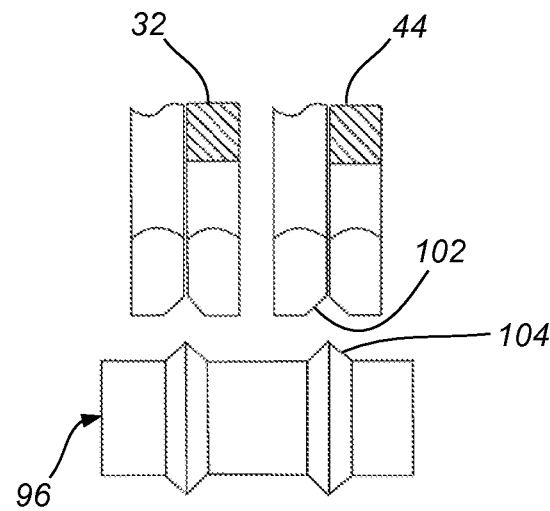
FIG. 5B is a schematic cross-sectional view of a plurality of wire end pairs adjacent a rotary cutting tool that is configured to cut a surface profile having an internal chamfer.

FIG. 5B illustrates a wire surface profile with an internal chamfer 102 that is machined via a protuberance 104 extending from the cutting tool 96. As shown, the protuberance 104 may align with the joined edge faces of the wire pairs to create the chamfer at the wire interface. The chamfer may aid in confining the flow of molten weld material and/or promoting deeper weld penetration at the mating faces of the joined wire pairs.

Figure 5C:
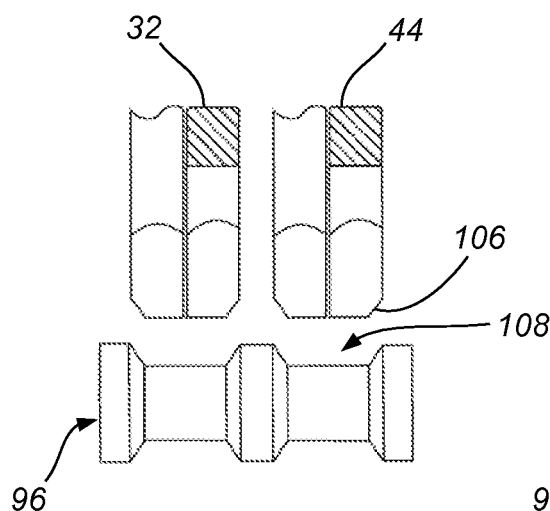
FIG. 5C is a schematic cross-sectional view of a plurality of wire end pairs adjacent a rotary cutting tool that is configured to cut a surface profile having external chamfers.

FIG. 5C illustrates a surface profile with an external chamfer 106 that is machined by a cutting tool 96 with shaped recesses 108 designed to chamfer the outer edges of the wire pairs while also surfacing the wire ends. Such an external chamfer may ensure that the weld bead is deposited near the mating faces of the joined wire pairs, and may further reduce the size of the weld area to decrease the overall packaging size of the stator assembly 10 in the welded wire pair area.

Figure 5D:
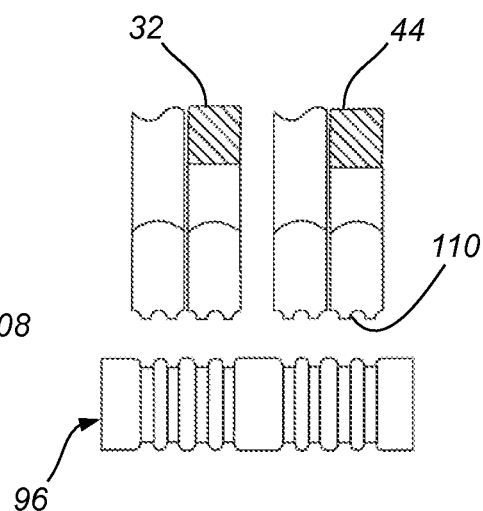
FIG. 5D is a schematic cross-sectional view of a plurality of wire end pairs adjacent a rotary cutting tool that is configured to cut a surface profile having a plurality of grooves.

Finally, FIG. 5D generally illustrates a serrated or grooved surface profile 110 that is cut by a similarly designed cutting tool 96. The serrated profile 110 may offer the advantages of the internal chamfer 102 and the external chamfer 106, while also increasing the surface area of the wire ends for improved heat transfer during the welding process. The grooves of the serration may also limit the flow of the molten weld bead material to contain the weld bead on the wire ends.

Figure 6:
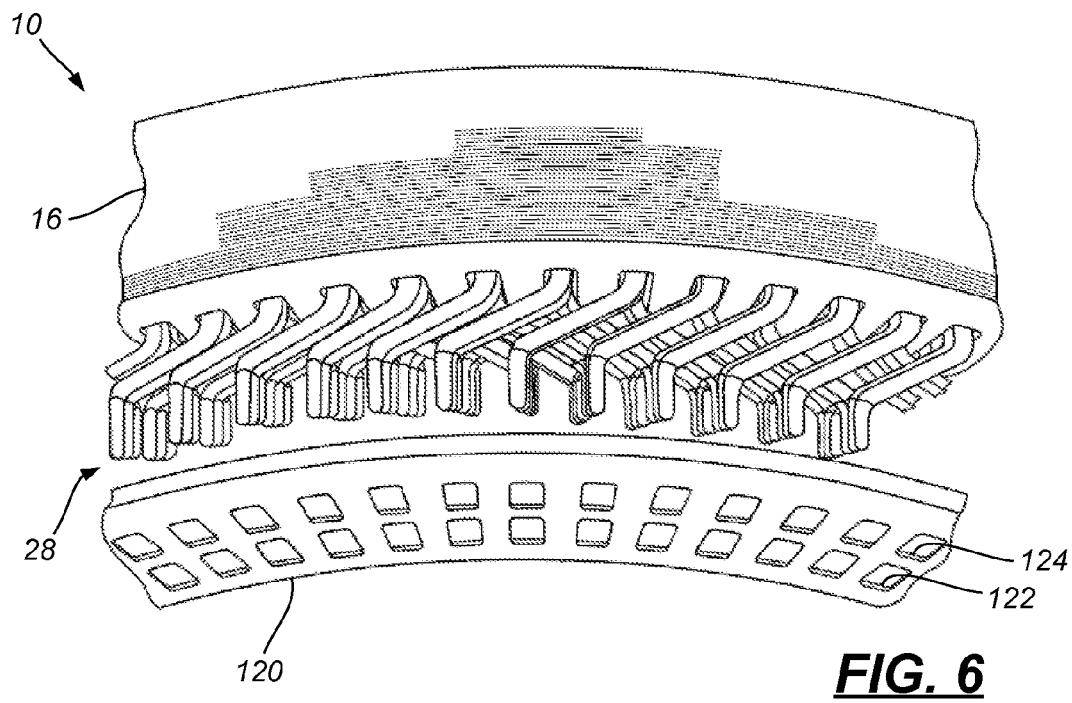
FIG. 6 is a partial schematic perspective view of a ring fixture adjacent to a wire end portion of a stator assembly.
Figure 7:
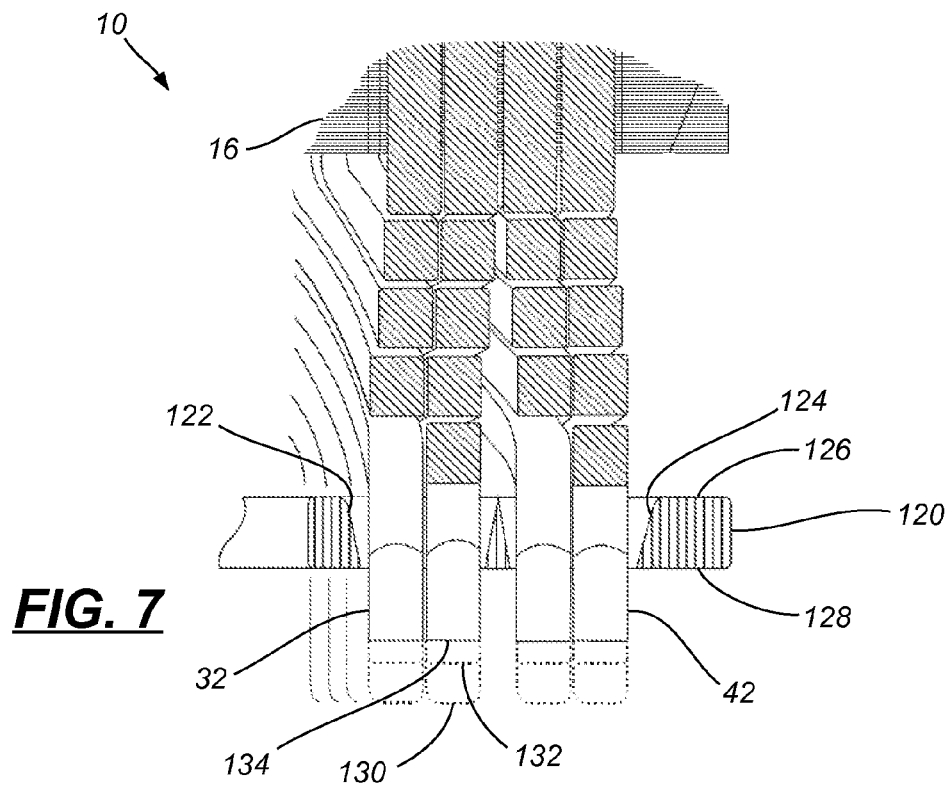
FIG. 7 is a partial schematic cross-sectional view of a plurality of conductors extending through a ring fixture.

As generally illustrated in FIGS. 6 and 7, in one configuration, a ring fixture 120 may be used to stabilize the wire ends during the trimming, shaping, and welding processes described above. FIG. 6 generally illustrates a partial section of the ring fixture 120 below the stator assembly 10 prior to its installation. In one configuration, the ring fixture 120 may include two concentric rings of rectangular holes 122, 124 (respectively) that may align with the intended position of each of the wire pairs.

FIG. 7 is a partial cross section of the stator assembly 10 with the ring fixture 120 disposed about the wires. The section has cut through several un-labeled wires that are on their helical path to meet their particular wire pair partner, and through the wires that populate the particular stator slot 18 that is cut by the section.

The rectangular holes 122, 124 of the ring fixture 120 may have a tapered cross section with a larger cross-sectional opening on the stator-side 126 of the fixture 120 than on the non-stator-side 128. The tapered holes may be advantageous for many reasons. As may be appreciated, the taper may generally reduce the effort required to insert the ring fixture by effectively funneling the wire ends into the hole. In this manner, the fixture may align the wire pairs into proper position as the ring is being forced on the stator assembly 10. Finally, the taper may also urge the mating surfaces of the wire pairs into close contact for trimming, surfacing and optionally, welding.

The ring fixture 120 may serve multiple purposes for the stator preparation and assembly. As mentioned, when the fixture 120 is installed, it may ensure proper positioning of the wire pairs, as well as the alignment of mating surfaces of the wire pairs. The ring fixture 120 may also stiffen the wire pairs for the trimming and surfacing operations. FIG. 6 shows wire pairs 32, 42 as they have emerged through their respective holes 122, 124 in the ring fixture 120. After the ring fixture 120 is installed, the wire pairs 32, 42 may be trimmed from the original wire length 130 to the trimmed length 132 and finally surfaced to a weld ready length and surface condition 134. Both the trimming and surfacing operations are aided by the force reaction capability of the ring fixture 120, since it imparts the stiffness of the full set of the wire pairs on the particular wire pair(s) that are being trimmed or surfaced (i.e., strength in numbers). The ring fixture 120 also may act as a shield to prevent particles and dust generated in the trimming and surfacing operations from being propelled toward the stator laminate stack 16.

In one configuration, the ring fixture 120 may be removed and reused in subsequent stator assemblies 10. Alternately, the ring fixture 120 may be left in place during the welding of the wire pairs 32, 34 to ensure precise location of the surfaced wire pairs (i.e., an aid for mechanized welding). During the welding process, the ring fixture may further serve as a shield to keep weld particles from dripping/splattering toward the stator laminate stack 16. Additionally, the ring fixture 120 may act as a heat shield to reduce the weld induced damage to the insulation of the unstripped portions of the bar pin wires.

Finally, in one configuration, the ring fixture 120 may be left on the stator 10 as a permanent component. As a permanent component of the stator assembly 10, the ring fixture 120 could be manufactured from an insulating material, such that it may act as an insulting brace to isolate the wires from each other. The controlled wire pair position, via the ring fixture, would also ensure that the complex weave of wires would not shift over time between the stator laminate stack 16 and the pair-welded ends.

The structural stiffness and positional precision of the wire pairs 32, 42 in the ring fixture 120 may further enable other, non-welding, methods of wire pair joining to be used. For example, with the wire pair joint integrity reinforced by the ring fixture 120, a crimp ring could be used to join the wires. Likewise, the use of a solder bath may also be used to electrically couple the wire pairs (without regard for the structural stability of the solder joint due to the added stiffness of the ring fixture 120).

While the best modes for carrying out the invention have been described in detail, those familiar with the art to which this invention relates will recognize various alternative designs and embodiments for practicing the invention within the scope of the appended claims. It is intended that all matter contained in the above description or shown in the accompanying drawings shall be interpreted as illustrative only and not as limiting.

The invention claimed is:

1. A method of preparing a plurality of bar-wound stator conductors for electrical interconnection comprising:
   inserting the plurality of conductors into a stator;
   twisting the plurality of conductors such that a first conductor of a first row is adjacent to a second conductor of a second row;
   trimming the adjacent first and second conductors to a common length using a trimming device;
   grinding the trimmed first and second conductors to a pre-determined surface profile using a rotary cutting tool.

2. The method of claim 1, wherein each of the plurality of conductors includes an insulation layer disposed about the surface of the conductor; and
   the method further comprising removing the insulation layer proximate to an end of each of the respective first and second conductors.

3. The method of claim 1, wherein the stator includes a plurality of slots, and wherein inserting the plurality of conductors into the stator includes inserting four of the plurality of conductors into each of the plurality of slots; and
   wherein each of the first row and the second row comprise four conductors disposed in a respective slot.

4. The method of claim 3, further comprising sensing an angular position of the stator; and
   controllably rotating the stator to align a row of conductors with the trimming device.

5. The method of claim 4, further comprising transitioning the trimming device from an operational position to a docked position prior to controllably rotating the stator; wherein the docked position is more removed from the stator than the operational position.

6. The method of claim 1, wherein trimming the adjacent first and second conductors to a common length includes removing a portion of each of the respective first and second conductors through shearing.

7. The method of claim 1, wherein trimming of the first and second conductors forms a burr that protrudes from each respective conductor; and wherein grinding the trimmed first and second conductors to a pre-determined surface profile includes removing the burr.

8. The method of claim 1, wherein the pre-determined surface profile includes an internal chamfer.

9. The method of claim 1, wherein the pre-determined surface profile includes a plurality of grooves.

10. The method of claim 1, further comprising stabilizing the plurality of conductors using a ring fixture defining a plurality of holes that extend through the fixture and are configured to receive the conductors;
    wherein the ring fixture includes a stator-side facing the stator and a non-stator side facing away from the stator; and
    wherein each of the plurality of holes have a larger cross-sectional area at the stator side than at the non-stator side.

11. A method of preparing a plurality of bar-wound stator conductors for electrical interconnection comprising:
    inserting the plurality of conductors into a stator;
    twisting the plurality of conductors such that a first conductor of a first row is adjacent to a second conductor of a second row;
    stabilizing the plurality of conductors using a ring fixture defining a plurality of holes that extend through the fixture and are configured to receive the conductors;

trimming the adjacent first and second conductors to a common length using a trimming device;

grinding the trimmed first and second conductors to a pre-determined surface profile using a rotary cutting tool.

12. The method of claim 11, wherein the ring fixture includes a stator-side facing the stator and a non-stator side facing away from the stator; and wherein each of the plurality of holes have a larger cross-sectional area at the stator side than at the non-stator side.

13. The method of claim 11, wherein each of the plurality of conductors includes an insulation layer disposed about the surface of the conductor; and the method further comprising removing the insulation layer proximate to an end of each of the respective first and second conductors.

14. The method of claim 11, wherein the stator includes a plurality of slots, and wherein inserting the plurality of conductors into the stator includes inserting four of the plurality of conductors into each of the plurality of slots; and wherein each of the first row and the second row comprise four conductors disposed in a respective slot.

15. The method of claim 14, further comprising sensing an angular position of the stator; and controllably rotating the stator to align a row of conductors with the trimming device.

16. The method of claim 15, further comprising transitioning the trimming device from an operational position to a docked position prior to controllably rotating the stator; wherein the docked position is more removed from the stator than the operational position.

17. The method of claim 11, wherein trimming the adjacent first and second conductors to a common length includes removing a portion of each of the respective first and second conductors through shearing.

18. The method of claim 11, wherein trimming of the first and second conductors forms a burr that protrudes from each respective conductor; and wherein grinding the trimmed first and second conductors to a pre-determined surface profile includes removing the burr.

\* \* \* \* \*